United States Patent
Griswold et al.

(10) Patent No.: US 11,052,351 B1
(45) Date of Patent: Jul. 6, 2021

(54) PLEATED FILTRATION APPARATUS HAVING A FILTER MEMBRANE

(71) Applicant: U.S. Government as Represented by the Secretary of the Army, Dover, NJ (US)

(72) Inventors: Kimberly A. Griswold, Flanders, NJ (US); Scott Waisner, Vicksburg, MS (US); Yao Chen, Brooklyn, NY (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 308 days.

(21) Appl. No.: 15/924,724

(22) Filed: Mar. 19, 2018

(51) Int. Cl.
| | |
|---|---|
| *B01D 63/06* | (2006.01) |
| *C02F 1/44* | (2006.01) |
| *B01D 69/10* | (2006.01) |
| *B01D 69/14* | (2006.01) |
| *C02F 1/72* | (2006.01) |
| *B01D 71/08* | (2006.01) |
| *B01D 63/14* | (2006.01) |
| *B01D 71/64* | (2006.01) |
| *B01D 71/38* | (2006.01) |
| *C02F 103/00* | (2006.01) |

(52) U.S. Cl.
CPC .......... *B01D 63/067* (2013.01); *B01D 63/14* (2013.01); *B01D 69/10* (2013.01); *B01D 69/145* (2013.01); *B01D 71/08* (2013.01); *B01D 71/38* (2013.01); *B01D 71/64* (2013.01); *C02F 1/44* (2013.01); *C02F 1/725* (2013.01); *B01D 2315/10* (2013.01); *C02F 2103/002* (2013.01); *C02F 2303/04* (2013.01); *C02F 2305/10* (2013.01)

(58) Field of Classification Search
CPC ...... B01D 63/067; B01D 63/14; B01D 71/64; B01D 71/08; B01D 71/38; B01D 69/10; B01D 69/145; B01D 2315/10; C02F 1/44; C02F 1/725; C02F 2303/04; C02F 2305/10; C02F 2103/002
See application file for complete search history.

(56) References Cited

U.S. PATENT DOCUMENTS

| | | | |
|---|---|---|---|
| 1,410,017 A | 3/1922 | Kessler | |
| 3,007,579 A | 11/1961 | Pall | |
| 3,178,028 A * | 4/1965 | Charnock | ............ B01D 29/46 210/487 |
| 3,242,073 A * | 3/1966 | Guebert | ............ B01J 20/28004 210/764 |

(Continued)

*Primary Examiner* — Liam Royce
(74) *Attorney, Agent, or Firm* — John P. DiScala

(57) ABSTRACT

The present invention is directed to rigid filtration apparatus comprising a filter support and filter membrane. Such filter support is comprised of a central core. Radiating from the central core are a plurality of pleats composed of two angled walls terminating at a contact point. Such longitudinal walls circumscribe a longitudinal channel situated between the walls wherein the longitudinal channel is in communication with the central core. The longitudinal walls are comprised of a plurality of openings along the walls. A filter membrane having biocidal components may be utilized with the filter support to effectively treat contaminated fluid, gas or air. Alternatively, the composition of the rigid central core and the rigid pleats may be composed of different materials to selectively remove chemicals, biological components or pharmaceuticals in a multi-stage treatment process.

13 Claims, 12 Drawing Sheets

(56) References Cited

U.S. PATENT DOCUMENTS

| | | | |
|---|---|---|---|
| 3,289,847 A | 12/1966 | Rothemund | |
| 3,291,310 A * | 12/1966 | Marvel | B01D 29/66 |
| | | | 210/167.13 |
| 3,370,710 A * | 2/1968 | Bluemle, Jr. | B01D 63/14 |
| | | | 210/321.77 |
| 3,551,091 A | 12/1970 | Veloz | |
| 5,790,934 A * | 8/1998 | Say | B01D 53/885 |
| | | | 204/157.15 |
| 6,719,907 B2 | 4/2004 | Collins | |
| 7,534,349 B2 | 5/2009 | Collins | |
| 8,557,115 B2 | 10/2013 | Collins | |
| 2005/0224407 A1 * | 10/2005 | Hacker | B01D 29/21 |
| | | | 210/450 |
| 2012/0292236 A1 | 11/2012 | Jacobs | |
| 2014/0131270 A1 * | 5/2014 | Zeiler | B01D 29/21 |
| | | | 210/493.1 |
| 2015/0266011 A1 * | 9/2015 | Griswold | B01J 31/38 |
| | | | 502/154 |

* cited by examiner

PLEATED FILTRATION APPARATUS HAVING A FILTER MEMBRANE

RIGHTS OF THE GOVERNMENT

The inventions described herein may be manufactured and used by or for the United States Government for government purposes without payment of any royalties.

FIELD OF INVENTION

This invention relates generally to a filtration apparatus having a filter membrane and a support for such membrane. More specifically, this invention is directed to a multifunctional filtration apparatus that can treat microorganisms and remove particulates in a single unit.

BACKGROUND OF THE INVENTION

Clean water is necessary to sustain human life. Methods to obtain clean water utilizes various forms of filtration apparatuses to remove particulates, microorganisms and harmful chemicals. A simple method to filter particulates utilizes permeable and semi-permeable membranes that regulate the type/size of elements that flow through the membrane. The path of the water travels from one membrane to the next through a process train to effectively separate the element of interest out by size until the desired purification is achieved.

Most membrane filters are either dead-end filters or tangential flow filtration. Dead-end filtration (also known as direct flow filtration) occurs when the feed (liquid containing particulates) is passed perpendicular through the face of the membrane leaving the particulates behind. Tangential flow filtration (also known as cross flow filtration) occurs when the feed travels tangentially or parallel to the surface of the membrane whereby some of the fluid passes through the membrane (permeate) while the remainder (retentate) recirculates. A filter is deemed multifunctional when both or either dead-end filtration and tangential filtration is used without cross-contamination of the permeate. Cross-contamination is based on water quality requirements dictated by Food & Drug Administration (FDA) for potable water, Environmental Protection Agency (EPA) for discharge into environment, the municipality or DOD standards for reuse.

Not many filter systems provide multifunctional filtration in a single filter for concurrent filtration. U.S. Pat. No. 8,557,115 issued to Collins et al describes a dual stage system with two separate filters working in tandem within the same housing. This dual stage ultrafilter is deemed a dead-end filter through a series of filters (2 different stages) and does not allow for tri-stage (3 different filter mechanisms or filter stages) filtration.

Typical conventional filtration methods also do not permit use of the same filter system to treat grey water and potable water due to differing criteria to meet the standards for each. Conventional filtration methods do not allow same effluent source to be used for grey water reuse and potable water without separating flow to each individual treatment process due to the strict requirements for each. Grey water reuse is typically a separation process and based on hygiene standards, can only allow a certain percentage of water to be reusable due to the PPM (of chemical contaminants not total coliforms) acceptable in reuse water. Both PPM and total coliform count is a standard for potable water. Potable water can be reused for grey water reuse, but without an added step such a treatment (i.e. chlorine), grey water reuse is not typically converted to potable water. Typical systems occur in series to prevent cross contamination and often backwash of all accumulated particulates after a number of filtering cycles. Should a single discharge source be used, water would be diverted to two separate systems to process for either grey water reuse or potable water. Bi-phasic separation of chemicals are not possible with traditional water filters and requires additional and separate filters to perform the work. Conventional ways do not consolidate the various filters together because of manufacturing and technical hurdles.

These mechanical filtration systems, however, do not necessary treat microorganisms to the level that is defined as ASTM biocidal without combining it with other means of treatment such as chemical treatment using chlorine, light activated sanitation using UV, or free radical generation using a photocatalyst.

These multi-stage treatment systems require multiple pieces of equipment which are cumbersome, impede mobility and require excessive maintenance. For expeditionary forces, there is a need for lightweight and small size filters free from long-scheduling supply chains that can meet most purification needs.

The present invention addresses these needs by disclosing a filter that has the ability to filter the same effluent (discharge source) and separate it into the two streams based upon physical ports (channels or pores). The treated material may then be further treated to remove chemical components (such as biphasic methodology) using the same filtration apparatus.

SUMMARY OF THE INVENTION

It is an object of the invention to provide an improve filtration apparatus comprised of a filter support and filter membrane. One aspect of the invention is the filter support having a central core and longitudinal axis circumscribed by a circular wall wherein the circular wall permits the flow of substance into and out of the circular wall and a plurality of rigid pleats extending radially from the circular wall, wherein each rigid pleat is comprised of two longitudinal walls having openings on said walls and wherein the longitudinal walls terminate at a contact point. The angled walls enclose a longitudinal channel situated between the walls, and wherein the longitudinal channel is in communication with the central wall.

In another aspect of the invention, a plurality of peripheral channels are disposed at the junction between the circular wall and each rigid pleat.

In another aspect of the invention, the peripheral channels comprises openings along the walls, wherein said openings are in direct communication with the longitudinal channels or central core.

In another aspect of the invention, the circular wall is comprised of openings and wherein said openings are in direct communication with the longitudinal channel.

In another aspect of the invention, the filtration apparatus comprises between 8 to 28 rigid pleats.

In another aspect of the invention, the filtration apparatus is composed of a filter membrane having photocatalyst embedded in such membrane.

In another aspect of the invention, the central core and the rigid pleats are comprised of different materials.

BRIEF DESCRIPTION OF THE DRAWINGS

Further features and advantages of the present invention may be understood from the drawings.

DETAILED DESCRIPTION

Disclosed herein is an apparatus useful for filtering liquids, air or gas. While examples used herein refer to liquids, it is contemplated that the disclosed filtration apparatus may be useful for treatment of gas and air as well. The filtration apparatus of the present invention is comprised of two distinct components—a filter membrane and a rigid support.

Figure 1:
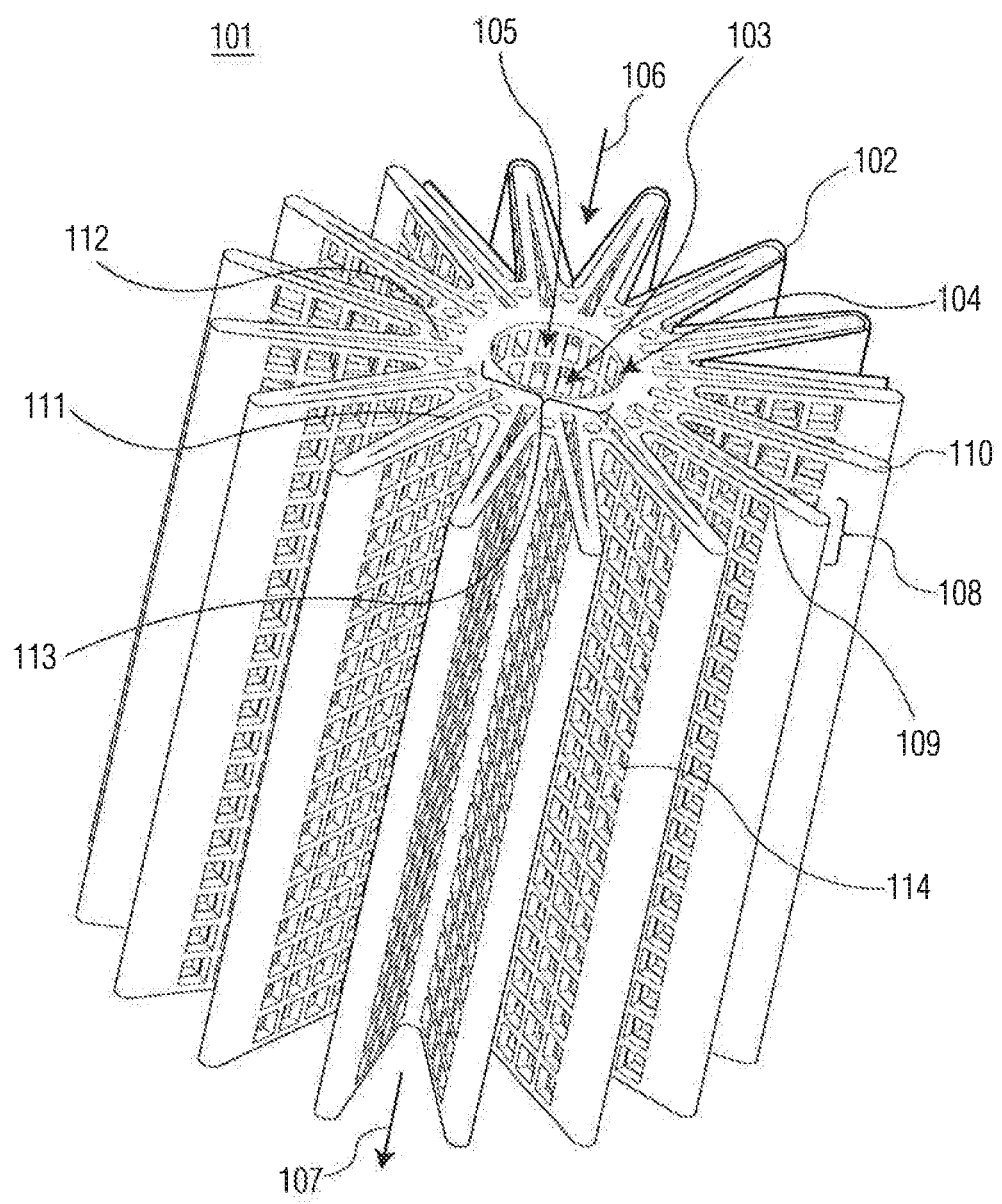
FIG. 1 is an illustration of an exemplary filtration support having a central core and plurality of pleats surrounding the central core.

Referring to FIG. 1, the rigid support 101 is composed of a single central core having a longitudinal axis 103. The rigid support structure provides support to a filtration membrane 102 (partially shown in FIG. 1). The longitudinal central core may be circumscribed by an optional circular wall 104 having multiple openings along the entire length of the wall 105. On one end of the longitudinal central core may be an input end 106 where material to be treated (e.g. fluid, air or gas) enter the filter and on the opposite end is an output end 107 where the treated material leaves the filter for collection or further treatment. Material to be treated may also enter the filtration apparatus by passing it through the filter membrane 102 surrounding the plurality of pleats to neutralize biological contaminants and remove particulates. Radiating from the central core 113 are multiple triangular shaped columns that are hereinafter referred to as pleats 108. Each pleat is formed by the intersection of two walls 109 originating from the central core and terminating at a point 110. The two walls circumscribe a longitudinal hollow channel 111 between the walls. Each of the pleat walls have openings 114 along the surface of the walls that allow liquid, air or gas to flow laterally into the longitudinal channel 111. The liquid, gas or air may then flow into the central core for further treatment or consolidation of such treated material before exiting out of the filter system.

Multiple peripheral channels 112 may laterally surround the central core. Such peripheral channels are an optional feature. The peripheral channels may be located between each pleat and run parallel to the central core as illustrated in FIG. 1. The peripheral channels may be comprised of a continuous solid longitudinal wall allowing for an input and output of material along the longitudinal axis of the wall. Alternatively the wall surrounding the peripheral channels 112 may contain openings along the surface of the walls allowing for direct communication of the flow material between the peripheral channel 112 and the longitudinal channel 111 or between the peripheral channel and the central core 113. The presence or absence of the peripheral channels provides for multiple filtration configurations where one or more contaminated material may be filtered in series or in parallel using the same filter apparatus.

The filter support structure may be composing of any rigid material such as polymers and metals. Exemplary polymers include stiff acrylonitrile butadiene styrene (ABS), transparent polycarbonate (PC), high temperature resistant polyethylenimine (PEI), and rubbery thermoplastic polyurethane elastomer (TPE). Exemplary metals may include stainless steel, aluminum, titanium and cobalt chrome. The selection of a polymer or metal is dependent on the type of material being filtered. For filtering gases and air, porous material such as ABS should be avoided as the gas or air may diffuse through the material. The support can be prepared using additive manufacturing techniques such as 3D printing which may provide better results in producing and controlling the number and location of the wall openings, peripheral channels, longitudinal channels and pleat wall angles. It should be noted that the wall of the central core may be composed of a material different from the other rigid components of the filter support.

Pleats

The number of pleats and arrangement of the pleat walls that support the filter membrane may be configured to optimize contaminant filtration. For example, if the filtration system requires removal of biological organisms such as bacteria, viruses and parasites then certain filters based on pore size or filters treated with biocidal compounds can be used.

Biocidal compounds include photocatalysts that generate oxygen free radicals to kill microorganisms. To optimize the exposure of such filters to a light source, the pleat wall angles and number of pleats should be arrange to ensure maximum light exposure. Factors to consider in optimizing photocatalytic decontamination include: 1) Relative Luminous Intensity, RLI (%), 2) effluent flow rate and 3) the Light Incidental Angle (LIA); all of which show the relationship between kinetic rates and light energy input.

Figure 2:
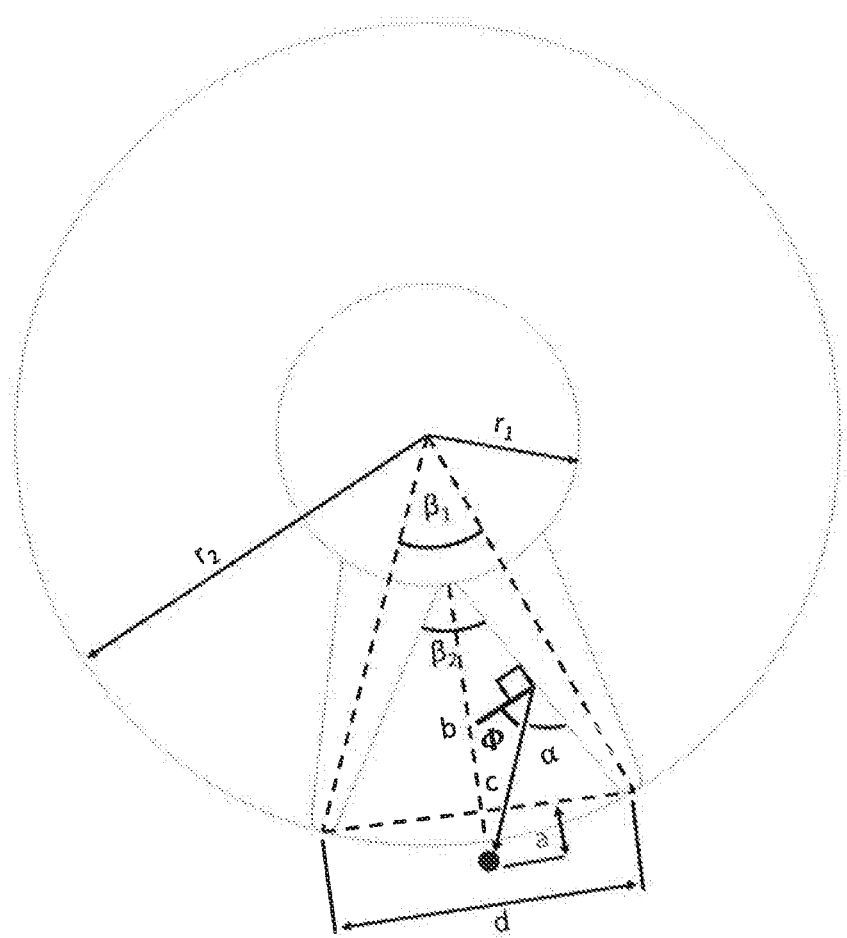
FIG. 2 is a diagram illustrating the angle of incidence for the pleats in the filtration support.

The formula below and FIG. 2 may assist in determining the number of pleats and angle of incidence on the filter support. FIG. 2 illustrate two circles and "wavelike" lines that oscillate between the inner and outer circle. The inner circle represents the central core 113 and the "wavelike" lines between the inner and outer circle represent the area where the pleats 108 reside on the filter support. With variables shown in the formula, such as "r1" and "r2", "Φ", "α", and etc., the angle of incidence "Φ" can be calculated at any angular distance "c" for any number of pleats "n". For example, in order for an exemplary filter to fit inside a typical filter support system, r1 is constrained to be 1.125 and r2 is 3. Whereas, r1 is the radius of the inside column and r2 is the radius of the outermost point of the filter apparatus.

Formula for angle of incidence and number of pleats
angle of light incidence on filter: $\Phi = 90° - \alpha$
number of pleats: n $$b = r_2 - r_1 + a$$

$$\beta_1 = \frac{2\pi}{n}$$

-continued $$d = 2r_2\sin\left(\frac{\beta_1}{2}\right)$$

$$d = 2(r_2 - r_1)\sin\left(\frac{\beta_2}{2}\right)$$

$$r_2\sin\left(\frac{\beta_1}{2}\right) = (r_2 - r_1)\sin\left(\frac{\beta_2}{2}\right)$$

$$\beta_2 = 2a\sin\left[\frac{r_2}{r_2 - r_1}\sin\left(\frac{\beta_1}{2}\right)\right] = 2a\sin\left[\frac{r_2}{r_2 - r_1}\sin\left(\frac{\pi}{n}\right)\right]$$

Φ will be at a maximum where when C=B and will be equal $$\pi - \frac{\beta_2}{2}.$$

Figure 4:
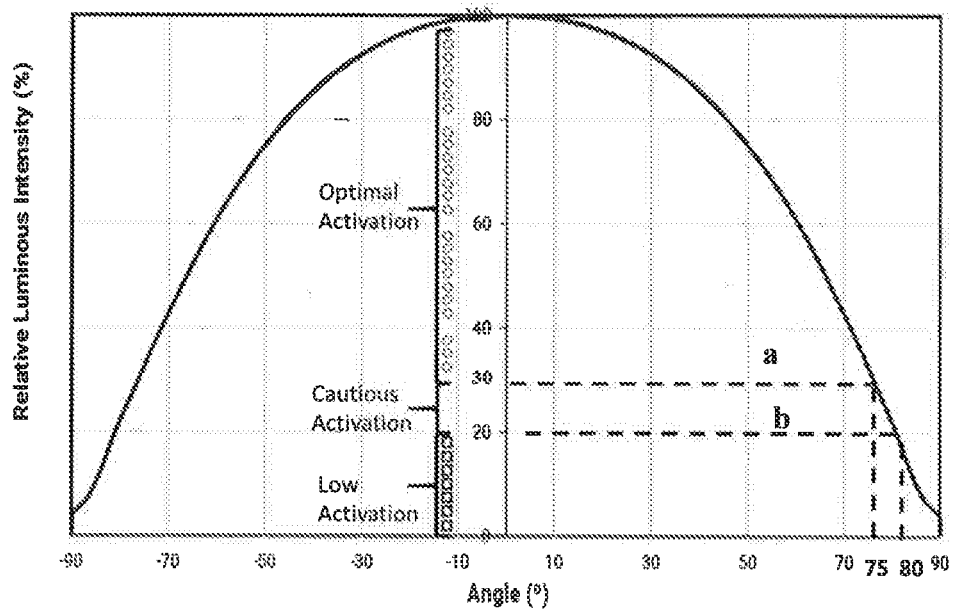
FIG. 4 is a graph illustrating the desired angle of incidence at relative luminous intensity.

Modeling experiments were performed using a representative photocatalyst such as fluoroalkylated fluoro phthalocyanines to determine an ideal number of pleats and angle of incidence. Activation of the fluoroalkylated fluoro phthalocyanines photocatalyst is correlated by the Relative Luminous Intensity, RLI (%), effluent flow rate and the Light Incidental Angle, LIA. FIG. 4 illustrates the RLI relationship for fluoroalkylated fluoro phthalocyanines photocatalyst which has a photo low activation range at 0-20% RLI, a cautious photo activation range at 20-30% RLI and an optimal photo activation range at 30-100% RLI. The activation ranges are based on balancing the rate of free radical generation to the flow rate of the effluent through the system. Optimal activation levels of 30-100% RLI generate free radicals quicker than the rate of effluent input, thus neutralizing the contaminants as quickly as they enter the filter. Cautious levels at 20-30% RLI generates barely enough free radicals to purify the contaminants as they enter. Low activation levels 0-20% RLI do not generate free radicals fast enough to purify the effluent before it exits the filter allowing for some contaminants to exit the filter untreated.

Figure 3A:
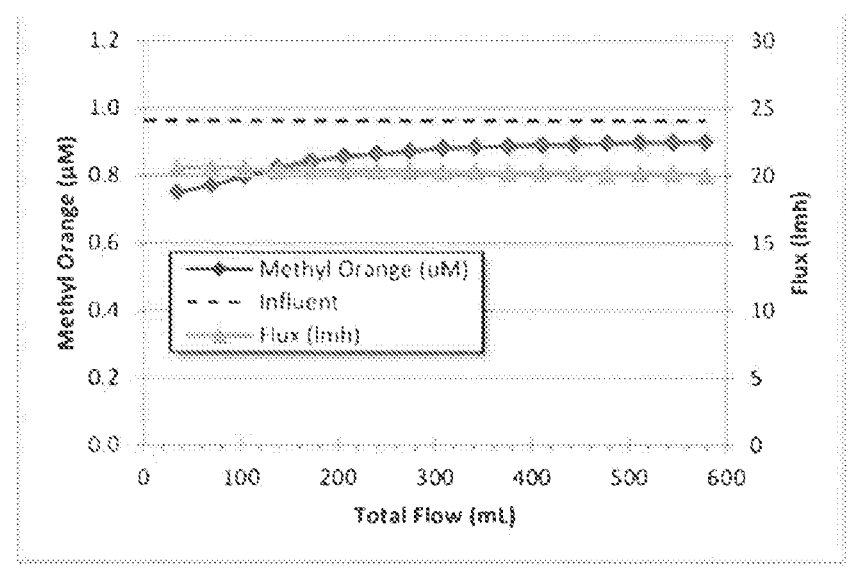
FIG. 3A is a graph plotting the change of methyl orange when exposed to 100% LED power.
Figure 3B:
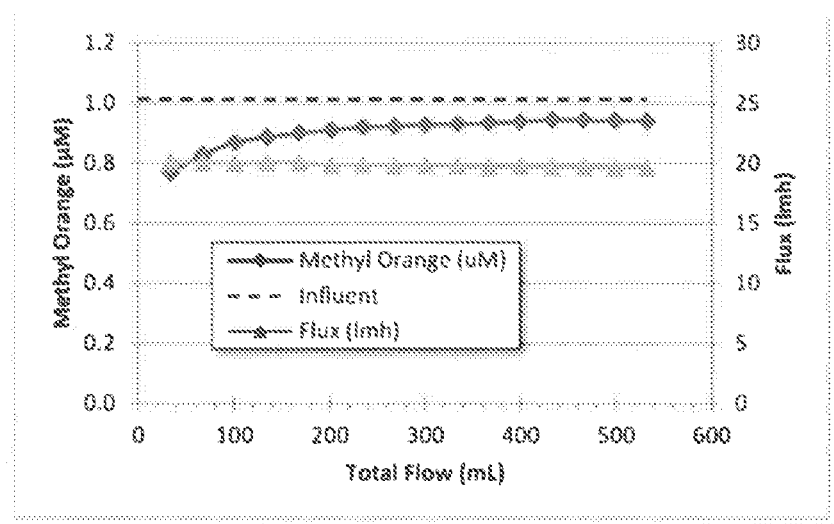
FIG. 3B is a graph plotting the change of methyl orange when exposed to 42.73% LED power.
Figure 3C:
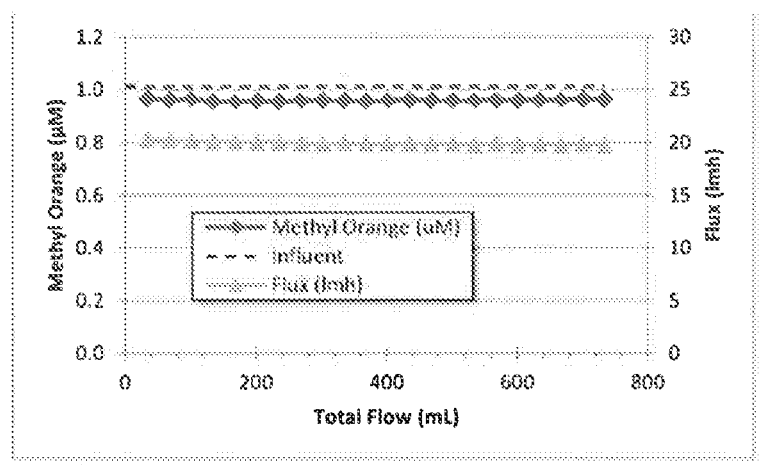
FIG. 3C is a graph plotting the change of methyl orange when exposed to 31.72% LED power.

The RLI categories of optimal, cautious, and low activation discussed above were generated by exposing a filter membrane embedded with fluoro phthalocyanine photocatalyst to test for its ability to form singlet levels of oxygen. An activation light source such as Cree Photo Red LED light at various power % levels was applied to the fluoro phthalocyanine photocatalyst embedded membrane. Methyl orange was used as an indicator of the detoxification activity of the fluoro phthalocyanine photocatalyst by measuring singlet oxygen production. FIG. 3A shows the change of methyl orange levels when introduced to 100% LED power, New Cree Photo Red light at about 22.7 W, Tmax at 41.9° C. Upon application of 100% LED power (FIG. 3A), the amount of methyl orange increased but remained below 1 μM (micro-Molar) suggesting that this LED power levels is acceptable. At 42.73%% LED power, Cree Photo Red at 9.7 W, Tmax at 27.4° C., (FIG. 3B), the method orange is still slightly below 1 μM suggesting that it is not ideal but still acceptable. At LED power of 31%, Cree Photo Red at 7.2 W, Tmax at 30.4 C, (FIG. 3C) and below 31% LED power, activation levels would be unacceptable as the methyl orange levels would be above 1 μM suggesting that the photocatalytic activity of fluoro phthalocyanine photocatalyst would not be effective to remove the biological impurities.

Two lines were drawn (line a and line b) on FIG. 4 assist to understand where the angle of incident cutoff point is. The optimal levels of activation at 30% RLI translates to a maximum light incidental angle of 75% (line a). Low activation levels start at 20% which translates into a maximum light incidental angle of 80% (line b). Based on FIG. 4, a light incidental angle to be below 75° is desirable. An angle of incidence of between 75° and 80° is cautious, while angles of above 80 is unacceptable.

Figure 5:
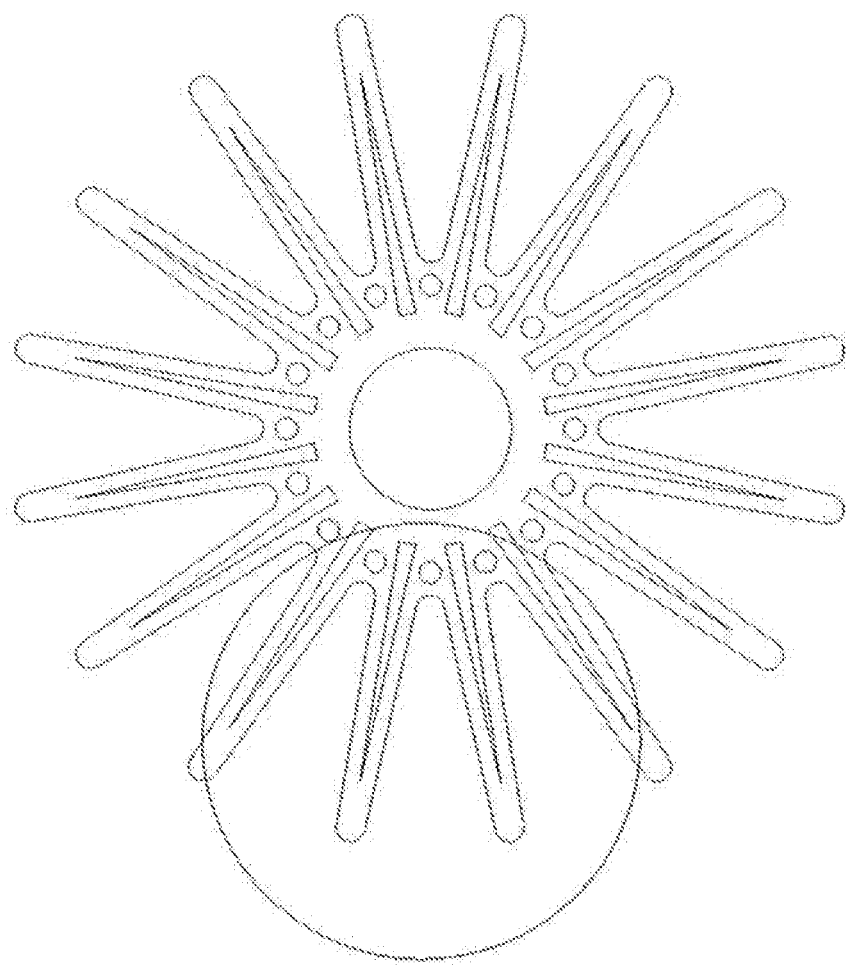
FIG. 5 is an exemplary filter design having 16 pleats.
Figure 6A:
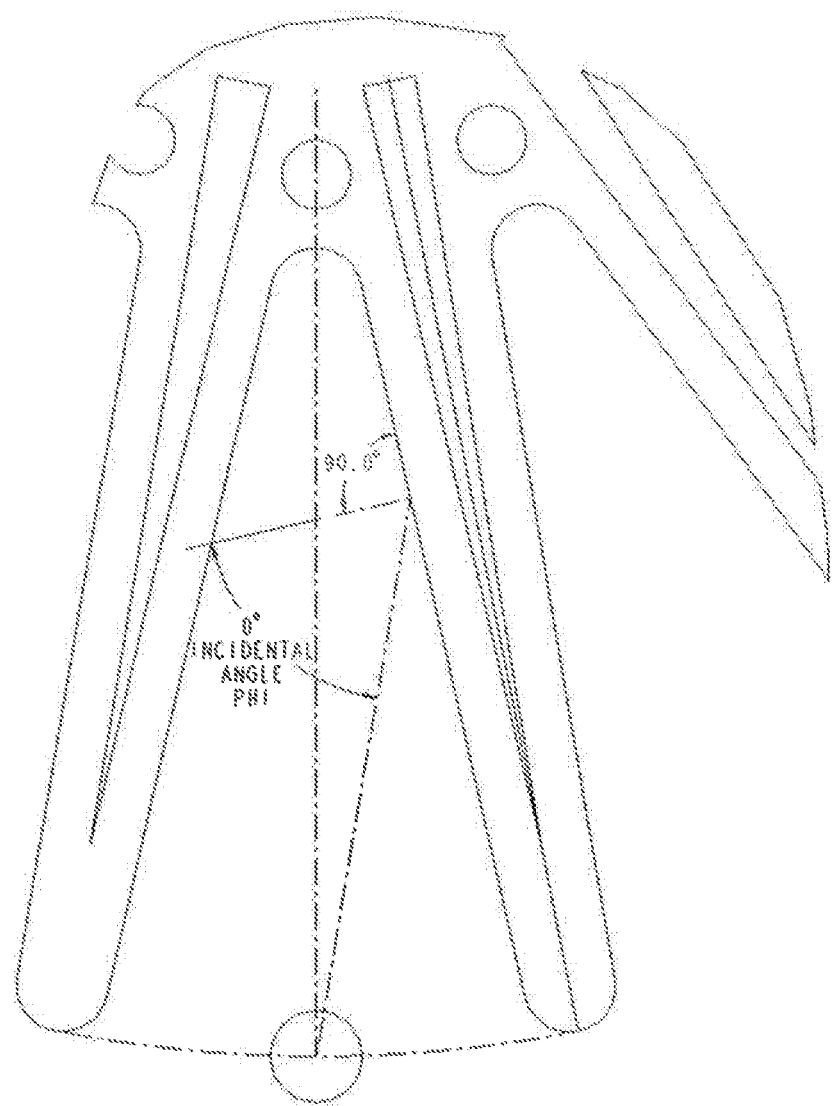
FIG. 6A illustrates the angle of incidence between two pleats from the cutout of FIG. 6.
Figure 6B:
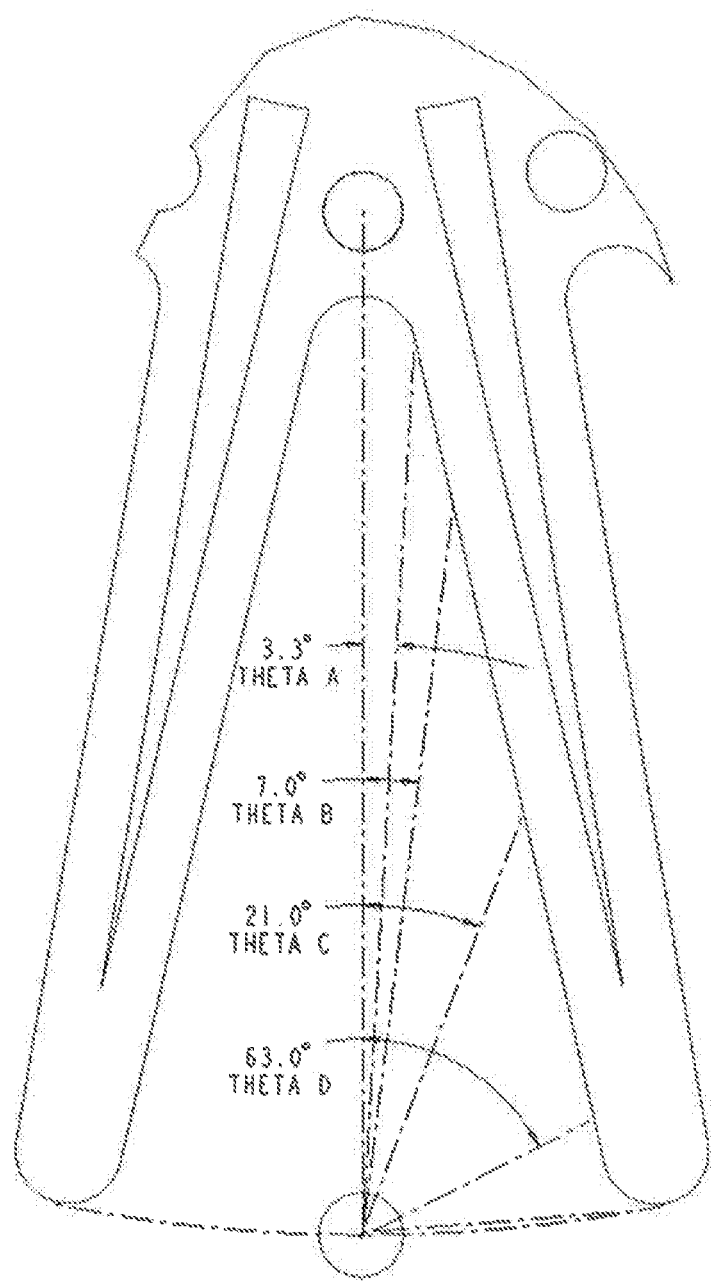
FIG. 6B illustrates the various angle of incidence when the pleat numbers are changed.

An exemplary filter design with 16 pleats is illustrated in FIG. 5. Between each pleat is a triangular shape void where an LED light is present to activate photocatalyst embedded on a membrane surface (membrane not shown). The incidental angle is illustrated in FIG. 6A. As the number of pleats increase, the incidental angel increases as shown in FIG. 6B. Depending on which exact location on the filter, the incident angle differs greatly. The chart below illustrates the incidental angle at various locations ranging from Theta A through Theta D.

| Number of Pleats | Incidental Angle at Theta A (°) | Incidental Angle at Theta B (°) | Incidental Angle at Theta C (°) | Incidental Angle at Theta D (°) |
|---|---|---|---|---|
| 8 | 59 | 56 | 41 | 0.72 |
| 16 | 74 | 70 | 56 | 14 |
| 18 | 76 | 72 | 58 | 16 |
| 28 | 80 | 77 | 63 | 21 |
| 32 | 81 | 78 | 64 | 22 |
| 64 | 85 | 82 | 68 | 26 |

Figure 7:
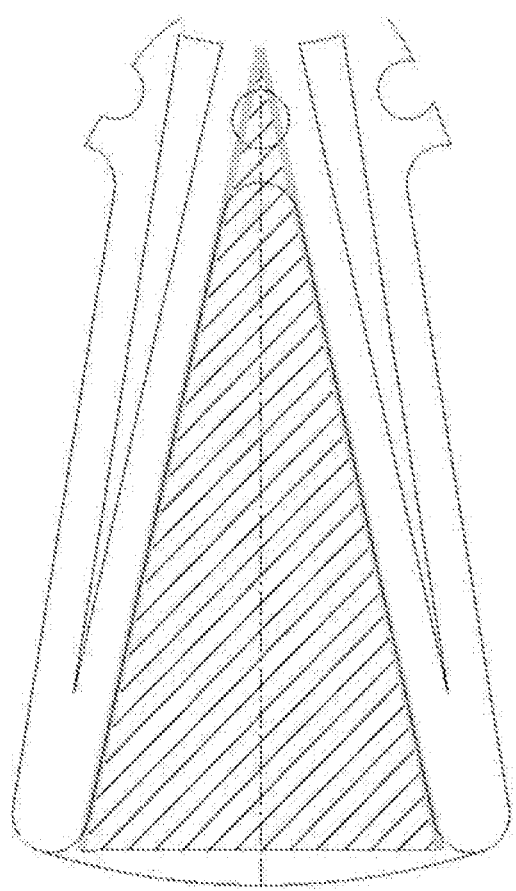
FIG. 7 illustrates the surface area between two pleats.

A low angle of incidents can be selected by having a low number of pleats such as any number below 16. Lowering the number of pleats would decrease the efficiency of the filter by creating a slower rate of effluent flow. To increase the rate of effluent flow through the system, a high surface area to volume ratio (SA:Vol) is required. Table 2 illustrates how SA:Vol (See FIG. 7) is affected when the number of pleats increases.

TABLE 2

| Number of Pleats | AARID Surface Area (SA) (in $\wedge$ 2) | AARID Volume (Vol) (in $\wedge$ 3) | SA:Vol | Max Incidental Angle (°) |
|---|---|---|---|---|
| 8 | 1112 | 591 | 1.88 | 59 |
| 16 | 2174 | 553 | 3.93 | 74 |
| 32 | 4324 | 469 | 9.22 | 81 |

At 8 pleats the SA:Vol ratio is at 1.88 while at 16 pleats it is at 3.93. The higher the SA:Vol the more effluent a photocatalytic membrane can treat in the system with usable light to increase concentration of singlet oxygen.

Based on the formula above and tests utilizing fluoro phthalocyanine photocatalyst, it has been determined that between 8 to 28 support pleats is recommended for membranes using photocatalysts. More preferably, between 8 to 16 support pleats are recommended for optimal exposure of the photocatalyst material to light. While these are the number of recommended pleats for filters containing photocatalysts, it is advised that any number of pleats may be used when photocatalysts are not used in the filter apparatus.

Filter Membrane

Filter (or filtration) membranes may be used with the filter support to facilitate removal of particulate matter or to neutralize biological contaminants. It is contemplated that semi-permeable filter membranes may be used with the filter support. The filter membrane should be selected based on the material being filtered and the desired output of the material. Exemplary filter membranes may include ultrafiltration membrane, microfiltration membrane, nano-filtration membrane, and reverse osmosis membranes. To enhance neutralization of biological and chemical contaminants, the filter membranes may be covered, embedded or impregnated with biocidal materials. Exemplary biocidal materials include pthalocyanines which is disclosed in U.S. Patent Application Publication No 20150266011, the disclosure of which is incorporated herein by reference in its entirety. Preferably fluoro phthalocyanine photocatalyst may be used. Additional photocatalytic material that may be used with the filter membranes include titanium dioxide, amino C60, alkali metals incorporated in tantalite such as doped sodium tantalite (loaded with cocatalyst nickel oxide, tin/silver/copper based transition metal oxides and semiconductors), ozone and photo-fenton.

The examples below illustrate various uses and configurations of the filter apparatus to accommodate one or more effluent source as well as cross or parallel filtration flow dynamics.

Example 1—Concurrent Filtration

Figure 8:
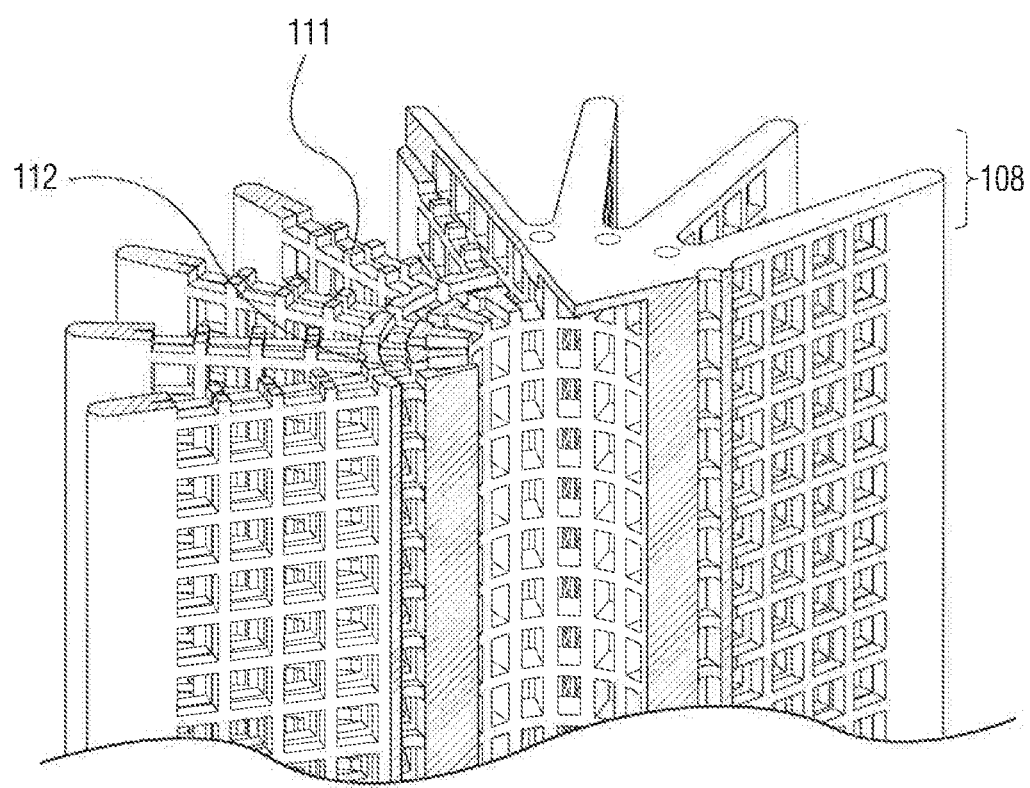
FIG. 8 illustrates an exemplary filtration apparatus for concurrent filtration.

FIG. 8 illustrates an exemplary filtration apparatus for concurrent filtration of two different effluents sources for use as either potable water or gray water. Effluent A (e.g. untreated water with heavy sediments for filtration into gray water) may enter the peripheral channels 112 (filter membrane not shown) from an input end located at the top-end of the filter to exit at the output end (not shown). At the same time, effluent B (e.g. untreated water comprised of microbes) may be introduced laterally and allowed to pass through filter membranes (not shown) interspersed between the pleats. After passing through the filter membranes, filtered effluent B may flow through the longitudinal wall openings 114 on the rigid pleats 108 and enter the longitudinal channels 111 which is shown to be in communication with the central core 113 through the openings on the wall surrounding the central core. Depending on the purity level of the water, the central core may optionally have a filter membrane that may treat the water further by filtering out additional contaminants. At no time during filtration do the two effluent sources mix.

Example 2—Biphasic Filtration

The filtration apparatus may also be used to treat a single liquid source having multiple phases based on ion or chemical selectivity (the formation of the distinct phases is affected by the pH, temperature and ionic strength of the two components). For instance, liquid sources may be treated using the filter to remove proteins, enzymes, chemicals, or pharmaceutical material from the liquids along with particles and microbial organisms. Untreated liquids may be first filtered by passing such material through the filter membrane supported by the rigid pleats to neutralize or remove particles and biological materials. The treated liquid then enters the longitudinal channels for passage through the circular wall. The circular wall (without channels) acts as an additional filtration path to further remove chemicals based on their ionic affinity to the materials in the circular wall. The circular wall in this instance may be comprised of resins to aid in removal of chemicals. Such resins may be composed of dextran, polyethylene glycol (PEG), polyethylenimine (PEI) and polysulfonate. This process allows for recovery of multiple products from a single liquid source.

Example 3—Serial Treatment of the Same Effluent Source

In another configuration, the filter apparatus of the present invention may be used to filter a single effluent serially to remove multiple contaminants. Referring to FIG. 8, effluent A may be introduced to filter membranes supported by the rigid pleats. The treated liquid then flows into the longitudinal channel 111 which is in direct communication with the peripheral channels 112 by way of pores or holes on the peripheral channel walls. The resulting filtrate is recovered and introduced laterally to the filter membranes again. This second pass through the filter membranes removes additional contaminants. The filtrate from this second pass travels through the longitudinal channels into the central core where the final filtrate is recovered.

Example 4—Recovery of Multiple Filtrates

Figure 9:
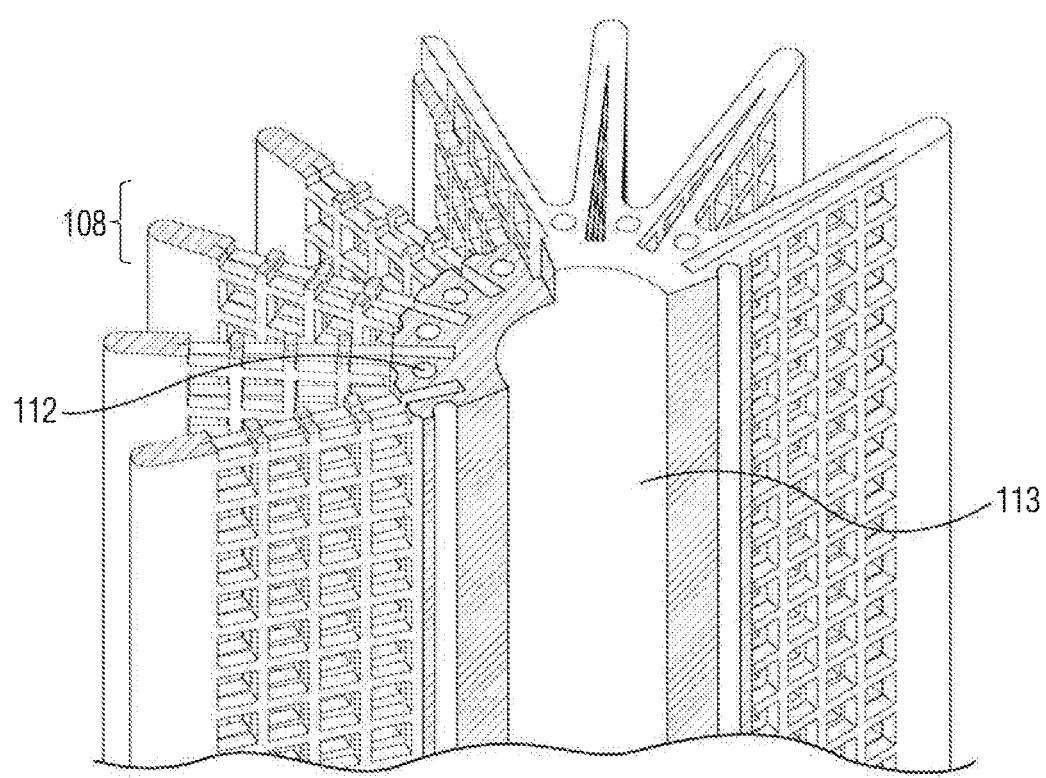
FIG. 9 illustrates an exemplary filtration apparatus for filtering a single effluent source.

In another aspect of the invention, the filter apparatus of FIG. 9 may be utilized to filter a single effluent to remove multiple contaminates by introducing the effluent source through the peripheral channels 112. An effluent source may be introduced into the peripheral channels which is lined with a filter membrane to remove contaminants by size. The recovered liquid may then be introduced to the filter membrane supported by the rigid pleats which may further filter the effluent for biological contaminants or particles. The resulting liquid may then be further treated by passing it through the circular walls made of resins comprising dextrans, PEG, PEI and polysulfonates based on the ionic attraction between the circular wall material and the chemicals in the liquid. The treated liquid may be collected in the central core where it is allowed to flow for further collection and use.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description but by the claims and any equivalents.

What is claimed is:

1. A filtration apparatus comprising:
    a filter support configurable for in a concurrent configuration providing simultaneous cross-flow filtration and parallel filtration comprising
        a central core having a longitudinal axis that is circumscribed by a circular wall wherein the circular wall permits the flow of a substance into or out of the circular wall via one or more wall openings;
        a plurality of rigid pleats extending radially from the circular wall, wherein each rigid pleat is comprised of two angled longitudinal walls having openings along each of the two angled longitudinal walls, and wherein each rigid pleat is further comprised of a terminal contact point, and wherein the two angled longitudinal walls enclose a hollow longitudinal channel situated between the two angled longitudinal walls, and wherein the longitudinal channel is in communication with the central core;
        a plurality of peripheral channels disposed at a junction between the circular wall and each rigid pleat wherein the plurality of peripheral channels are not in fluid communication with the longitudinal channel of each of the plurality of rigid pleats;

and wherein when configured in a concurrent configuration, a first effluent source enters the plurality of peripheral channels from an input end located at a top-end of the filter to exit at an output end of the filter and a second effluent source enters the filter support laterally through the plurality of longitudinal channels to exit through the central core.

2. The filtration apparatus of claim 1, further comprising a filter membrane situated between the plurality of pleats.

3. The filtration apparatus of claim 2, wherein the filter membrane comprises a photocatalyst within the filter membrane and wherein said filter membrane follows the angled longitudinal walls of the pleats.

4. The filtration apparatus of claim 3, wherein the plurality of pleats is between 8 and 16 number of pleats.

5. The filtration apparatus of claim 3, wherein the surface area of the angled longitudinal walls between two adjacent pleats to the volume of the area between said angled longitudinal walls (SA:Vol) is at least 1.88 to 3.93.

6. The filtration apparatus of claim 3, wherein the photocatalyst is selected from the group consisting of phthalocyanine, titanium dioxide, amino C60, alkali metals incorporated in tantalite, and photo-fenton.

7. The filtration apparatus of claim 3, wherein the photocatalyst is flurophthalocyanine.

8. The filtration apparatus of claim 1, wherein the central core comprises a filter membrane.

9. The filtration apparatus of claim 1, wherein the circular wall is comprised of a different material than the plurality of rigid pleats.

10. The filtration apparatus of claim 1, wherein the circular wall is comprised of a material that removes chemicals from an effluent based on their ionic affinity to the material.

11. The filtration apparatus of claim 10, wherein the material is selected from the group consisting of dextrans, polyethylene glycol, and polyethylenimine.

12. The filtration apparatus of claim 1, wherein the rigid pleats are comprised of a polymer selected from the group consisting of acrylonitrile butadiene styrene (ABS), transparent polycarbonate (PC), polyethylenimine (PEI), and thermoplastic polyurethane elastomer (TPE).

13. The filtration apparatus of claim 1, wherein the rigid pleats are comprised of a metal selected from the group consisting of stainless steel, aluminum, titanium and cobalt chrome.

* * * * *